United States Patent Office 2,965,546
Patented Dec. 20, 1960

2,965,546

BIOLOGICAL CONVERSION OF 5a(11a)-DEHYDRO-TETRACYCLINES TO BROAD-SPECTRUM ANTIBIOTICS

Jerry Robert Daniel McCormick, New City, N.Y., Newell Oscar Sjolander, Saddle River, N.J., and Ursula Hirsch, Pearl River, N.Y., assignors to American Cyanamid Company, New York, N.Y., a corporation of Maine No Drawing. Filed Apr. 5, 1957, Ser. No. 650,820

7 Claims. (Cl. 195—80)

This invention relates to a novel method of producing the broad-spectrum antibiotics tetracycline, chlortetracycline and bromtetracycline.

The broad-spectrum antibiotic chlortetracycline is produced by propagating microorganisms of the species *Streptomyces aureofaceins* in an aqueous nutrient medium under suitable aerobic conditions. The antibiotic and a method for its production are described in the U.S. patent to Duggar No. 2,482,055. A fermentation process for producing the broad-spectrum antibiotic tetracycline is described in the U.S. patent to Minieri et al. No. 2,734,-018. Bromtetracycline and a method for its production are described in the copending application of A. P. Doerschuk et al. Serial No. 580,663, filed April 25, 1956, entitled Production of Antibiotic II.

We have now discovered a new method of producing these important antibiotics which involves the biological conversion of certain new members of the tetracycline series, which in themselves are new antibiotics produced by a fermentation process described in the copending application of John A. Growich and Philip A. Miller, Serial No. 650,821, now abandoned, filed concurrently herewith.

As described more in detail in the Growich et al. application, these new antibiotics, 7-chloro - 5a(11a) - dehydrotetracycline, 5a(11a) - dehydrotetracycline and 7-bromo-5a(11a)-dehydrotetracycline are produced under suitable fermentation conditions by certain mutant strains of *S. aureofaciens*, some of which have been designated as S1308, S1308–29, S1308–V146, and S1308–V237, cultures of which have been deposited with the American Type Culture Collection in Washington, D.C., where they have been assigned ATCC accession numbers 12748, 12749, 12750 and 12751, respectively.

The biological activity of these new tetracyclines is fairly low. However, because the new mutant strains of *S. aureofaciens* which produce these new antibiotics are high-producing strains, frequently producing as much as 9,000–10,000 gammas per milliliter of 7-chloro-5a(11a)-dehydrotetracycline, for example, efforts have been directed towards converting these antibiotics into antibiotics possessing the typical desired broad-spectrum antibacterial activity.

One method for accomplishing this result resides in the discovery that these new antibiotics can be catalytically reduced in good yields to the broad-spectrum antibiotic tetracycline. A suitable reduction process is described in the copending application of Philip A. Miller filed concurrently herewith.

The present invention accomplishes the desired result by a biological conversion of these new antibiotics into the desired broad-spectrum antibiotics. Thus, in the manner hereinafter more particularly described, 7-chloro-5a(11a)-dehydrotetracycline is converted into chlortetracycline, 5a(11a)-dehydrotetracycline is converted into tetracycline, and 7-bromo-5a(11a)-dehydrotetracycline is converted into bromtetracycline.

The present invention may be carried out simply by the addition of the new antibiotics to a fermentation system employing conventional strains of *S. aureofaciens*. Thus, 7 - chloro - 5a(11a) - dehydrotetracycline when added to a conventional fermentation system employing conventional chlortetracycline-producing strains of *S. aureofaciens* is converted to chlortetracycline. The conversion has thus far been incomplete but has been found to range from 18% up to 48% conversion in most instances.

In a similar manner, when 7-bromo-5a(11a)-dehydrotetracycline is added to a fermentation system employing the conventional strains of *S. aureofaciens*, it is converted to bromtetracycline.

Likewise, 5a(11a)dehydrotetracycline is converted under the same conditions to tetracycline.

The conditions of the fermentation are generally the same as for the presently known methods of producing chlortetracycline and tetracycline by fermentation with the exception, of course, that the new antibiotic is added, preferably at the beginning of the fermentation. The fermentation medium contains the usual nutrients and mineral substances. Suitable nutrient substances which may provide those necessary substances include starch, dextrose, cane sugar, glucose, molasses, soybean meal, peanut meal, yeast, meat extracts, peptone, ammonium sulfate, urea, corn steep liquor, distillers solubles, fish meal and other conventional substances. The inorganic salts include such things as calcium carbonate, ammonium sulfate, ammonium chloride, sodium dihydrogen phosphate, and the various trace elements such as manganese, cobalt, zinc, copper, iron, and the like.

The other general conditions of the fermentation, such as hydrogen ion concentration, temperature, time, rate of aeration, preparation of the inoculum, sterilization, inoculation and the like are conventional and may be similar to those for the production of chlortetracycline shown in the U.S. patent to Duggar No. 2,482,055, and for the production of tetracycline shown in the U.S. patent to Minieri No. 2,734,018.

Similarly, the recovery of the chlortetracycline and tetracycline from the fermentation liquor is conventional and need not be described, as numerous methods of recovering these antibiotics from fermentation liquors have been published. Bromtetracycline may be recovered in a similar manner.

In the examples which follow it will be noted that some of the fermentation runs were carried out in the presence of certain chlorination inhibitors, i.e. 2,5-dimercapto-1,3,4-thiadiazole and 2-(2-furyl) - 5 - mercapto - 1,3,4 - oxadiazole. These inhibitors have the effect of altering the ratio of chlortetracycline to tetracycline in the normal chlortetracycline fermentation so that a high proportion of tetracycline is produced. In this manner, it is possible to observe more easily the formation of chlortetracycline that is due to its conversion from 7-chloro-5a(11a)-dehydrotetracycline since in the absence of such inhibitors increases in chlortetracycline due to the conversion of 7-chloro-5a(11a)-dehydrotetracycline might go unobserved.

The invention will be described in greater detail in conjunction with the following specific examples.

*Example 1*

A fermentation medium of the following composition is prepared:

Starch_____grams per liter__ 55
Corn steep liquor_____do____ 25
CaCO$_3$_____do____ 9
(NH$_4$)$_2$SO$_4$_____do____ 5.6
MnSO$_4$ (70%)_____milligrams per liter___ 80
CoCl$_2$.6H$_2$O_____do____ 5
NH$_4$Cl_____grams per liter__ 1.7
Lard oil_____percent by volume__ 3.2

After sterilization of the medium, 25 milliliters of the medium in a 250 milliliter Erlenmeyer flask is inoculated with a vegetative inoculum of *S. aureofaciens* (Strain S77. 100 parts per million of 2,5-dimercapto-1,3,4-thiadiazole and 500 gammas per milliliter of 7-chloro-5a(11a)-dehydrotetracycline are added and the fermentation is carried out for 120 hours at 25° C. on a rotary shaker. The mash is assayed fluorometrically for chlortetracycline and it is found that the increase in the fluorometric assay due to the addition of 7-chloro-5a(11a)-dehydrotetracycline amounts to 248 gammas per milliliter, representing 48% of the theoretical conversion of 7-chloro-5a(11a)-dehydrotetracycline to chlortetracycline.

*Example 2*

The procedure of the preceding example is followed with the sole exception that 10 parts per million of 2-(2-furyl)-5-mercapto-1,3,4-oxadiazole is added to the medium as a chlorination inhibitor. The increase in the fluorometric assay for chlortetracycline due to the addition of the 7-chloro-5a(11a)-dehydrotetracycline amounts to 170 gammas per milliliter representing 34% of the theoretical conversion of the added 7-chloro-5a(11a)-dehydrotetracycline to chlortetracycline.

*Example 3*

The procedure of Example 1 is followed except that 5a(11a)-dehydrotetracycline is added to the fermentation system and no inhibitor is used. The medium is then inoculated with a vegetative inoculum of *S. aureofaciens* (Strain S77). The conversion of the added 5a(11a)-dehydrotetracycline to tetracycline is approximately 35% complete.

*Example 4*

The procedure of Example 1 is followed except that 7-bromo-5a(11a)-dehydrotetracycline is added to the fermentation system. The medium is inoculated with a vegetative inoculum of *S. aureofaciens* (Strain S77). The conversion of the added 7-bromo-5a(11a)-dehydrotetracycline to bromtetracycline is about 30% complete.

We claim:

1. The process for the biological conversion of 7-chloro-5a(11a)-dehydrotetracycline to chlortetracycline which comprises adding crystalline 7-chloro-5a(11a)-dehydrotetracycline to an aqueous fermentation medium and aerobically fermenting the aqueous nutrient medium with a microorganism of the species *Streptomyces aureofaciens*.

2. In the process of producing chlortetracycline by aerobic fermentation of an aqueous fermentation medium with a microorganism of the species *S. aureofaciens*, the improvement which comprises carrying out the fermentation in the presence of added quantities of 7-chloro-5a(11a)-dehydrotetracycline.

3. The process for the biological conversion of 5a(11a)-dehydrotetracycline to tetracycline which comprises adding crystalline 5a(11a)-dehydrotetracycline to an aqueous fermentation medium and aerobically fermenting the aqueous nutrient medium with a microorganism of the species *Streptomyces aureofaciens*.

4. In the process of producing tetracycline by aerobic fermentation of an aqueous fermentation medium with a microorganism of the species *S. aureofaciens*, the improvement which comprises carrying out the fermentation in the presence of added quantities of 5a(11a)-dehydrotetracycline.

5. The process for the biological conversion of 7-bromo-5a(11a)-dehydrotetracycline to bromtetracycline which comprises adding crystalline 7-bromo-5a(11a)-dehydrotetracycline to an aqueous fermentation medium and aerobically fermenting the aqueous nutrient medium with a microorganism of the species *Streptomyces aureofaciens*.

6. In the process of producing bromtetracycline by aerobic fermentation of an aqueous fermentation medium with a microorganism of the species *S. aureofaciens*, the improvement which comprises carrying out the fermentation in the presence of added quantities of 7-bromo-5a(11a)-dehydrotetracycline.

7. The process for the biological reduction of the 5a(11a) double bond of an antibiotic of the tetracycline series which comprises adding an antibiotic of the tetracycline series having a double bond in the 5a(11a)-positions of the naphthacene ring to an aqueous fermentation medium and aerobically fermenting the aqueous nutrient medium with a microorganism of the species *S. aureofaciens*.

References Cited in the file of this patent

UNITED STATES PATENTS

| 2,699,054 | Conover | Jan. 11, 1955 |
| 2,712,517 | Gourevitch et al. | July 5, 1955 |
| 2,734,018 | Minieri et al. | Feb. 7, 1956 |

FOREIGN PATENTS

| 781,843 | Great Britain | Aug. 28, 1957 |

OTHER REFERENCES

Waller et al.: J.A.C.S., 74, 1952, pp. 4979–4982.

Sekizawa: Jour. of Biochemistry, vol. 42, No. 2, March 1955, pp. 217–219.

Doerschuk et al.: J. Am. Chem. Soc., vol. 78, No. 7, April 5, 1956, pp. 1508–1509.